Patented Nov. 21, 1944

2,363,074

UNITED STATES PATENT OFFICE 2,363,074

HALOGEN SUBSTITUTED ACYLAMINO SULPHONIC ACIDS OF THE AROMATIC SERIES AND THEIR MANUFACTURE

Henry Martin, Basel, Hans Heinrich Zaeslin, Riehen, near Basel, and Rudolf Hirt, Curt Glatthaar, and Alfred Staub, Basel, Switzerland, assignors to J. R. Geigy A. G., Basel, Switzerland No Drawing. Application June 15, 1942, Serial No. 447,181. In Switzerland June 16, 1938

4 Claims. (Cl. 260—506)

This application is a continuation-in-part of application Ser. No. 278,954, filed June 13, 1939 (now U. S. Patent No. 2,311,062).

This invention relates to the production of halogen substituted acyl amino sulphonic acids, the products being useful for various purposes in industry e. g. for protecting wool and other substances against damage by moths, the protection being very fast to washing and fulling.

According to the present invention halogen substituted acyl amino sulphonic acids of the aromatic series are produced by the treatment of 1-amino-3:4-dichlorobenzene-6-sulphonic acid with a halogen substituted phenyl carbamic acid halide or a corresponding phenylisocyanate. Other methods for the manufacture of unsymmetrical diphenylureas are also suitable.

The herein claimed unsymmetrical halogen-substituted diphenylureasulfonic acids are colorless compounds which, in the form of their alkali salts, are well soluble in water. They are predominantly suitable for protecting, according to the acid dyeing methods, wool, feathers, furs, hair, paper, textiles, leather, natural or artificial fibres or articles containing these substances from moths and other textile destructive grubs. The pronounced fastness to washing and fulling of the products claimed is particularly worth mentioning.

The following examples illustrate the process, the parts being by weight, where nothing else is said.

Example 1

12 parts of 1-amino-3:4-dichlorobenzene-6-sulphonic acid are dissolved in 75 parts by volume of dry pyridine. Then whilst stirring there are introduced at 10–15° C. in small portions, 15 parts of 3:4-dichlorophenyl carbamic acid chloride or the corresponding quantity of the bromide or of 3:4-dichlorophenylisocyanate and the whole is stirred for 1 hour at 40–50° C. When no further free amine is traceable, the reaction mixture is treated with soda solution and the reaction mixture is then treated with steam until no further pyridine passes over. The residue is boiled with water, filtered and treated with a little cooking salt solution. The condensation product, the N-3:4-dichloro-6-sulphophenyl-N'-3':4'-dichlorophenyl urea is obtained in beautiful colorless laminae which, after washing and drying in vacuo, give the following analysis:

Found—Cl:31.67%, S:7.06%. Yield very good.
Calculated—Cl:31.5%, S:7.08%.

Example 2

Into 500 parts of acetic acid ester which contain 135 parts of phosgene, there is slowly dropped a solution of 196 parts of 3:4:5-trichloraniline in 1000 parts of acetic acid ester while simultaneously passing therethrough a current of phosgene. After the reaction is achieved, the solvent is distilled off in vacuo at 30° C., whereby the formed 3:4:5-trichlorophenylcarbamic acid chloride remains as bright powder.

12.2 parts of the 1-amino-3:4-dichlorobenzene-6-sulphonic acid are dissolved in 100 parts by volume of dry pyridine. While stirring there are introduced at room temperature by small portions calculated quantities of the 3:4:5-trichlorophenylcarbamic acid chloride and the whole is stirred during one hour at 60° C. When on more free amine is detectable, after mixing with a soda solution the pyridine is blown off by means of steam. The residue is boiled with water up to solution, filtered and mixed with a little common salt solution. The product of condensation, the sodium salt of the 3:4:3':4':5'-pentachlorodiphenyl-urea-6-sulphonic acid is thus obtained in form of beautiful leaves. It is well soluble in warm water.

Example 3

Into 500 parts of acetic acid ester, which contain 135 parts of phosgene there is slowly dropped a solution of 196 parts of 2:4:5-trichloraniline in 1000 parts of acetic acid ester while simultaneously passing therethrough a current of phosgene. After the reaction is achieved, the solvent is distilled off warm, whereby the formed 2:4:5-trichlorophenylcarbamic acid chloride is converted under splitting off of hydrochloric acid into the 2:4:5-trichlorophenylisocyanate. 12.2 parts of 1-amino-3:4-dichlorobenzene-6-sulphonic acid are suspended in dry nitrobenzene and mixed while stirring at 10–15° C. by portions with the equivalent quantity of 2:4:5-trichlorophenylisocyanate. Then stirring is continued at room temperature, until no free amino group is detectable. The product is then mixed with a soda solution and the nitrobenzene is blown off by means of steam. The residue is dissolved in hot water, then there is filtered and the product of reaction is precipitated by means of common salt as grey resin. After some time, the same crystallizes in form of a solid mass which crystallizes out from dilute alcohol in form of small leaves.

Example 4

12.2 parts of 1-amino-3:4-dichlorobenzene-6- sulphonic acid are suspended in 200 parts by volume of dry nitrobenzene and intermixed at 25-30° C. with the calculated quantity of 4-chlorobenzoylazide, which is obtainable as usual by p-chlorobenzoylation of sodium azide and is dissolved in 50 parts of volume of nitrobenzene. The whole is heated to 50° C. until the diazotization reaction is negative. This is attained after about 48 hours. Thereupon the nitrobenzene is blown off by means of steam and after filtering the condensation product is salted out. The same is dried and obtained as colorless powder.

What we claim is:

1. The halogensubstituted unsymmetrical diphenyl urea sulphonic acids of the general formula

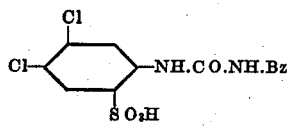

wherein Bz means a halogensubstituted aromatic radical of the benzene series, being in the form of the sodium salts colorless compounds soluble in water, these compounds being useful for durably protecting wool and other substances against moths.

2. The 3:4:3':4' - tetrachlorodiphenylurea - 6-sulphonic acid of the following formula

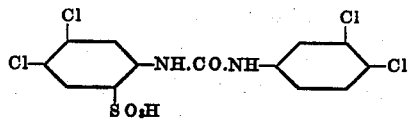

being, in the form of the sodium salt, beautiful colorless laminae, soluble in water, useful for durably protecting wool against moths.

3. The 3:4:3':4':5' - pentachlorodiphenylurea-6-sulphonic acid of the following formula

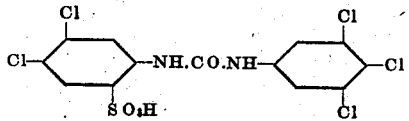

being, in the form of the sodium salt, beautiful small plates, soluble in water, useful for durably protecting wool against moths.

4. The 3:4:2':4':5' - pentachlorodiphenylurea-6-sulphonic acid of the following formula

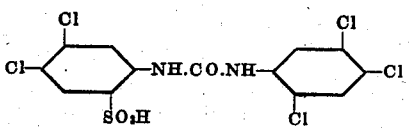

being, in the form of the sodium salt, beautiful small plates, soluble in water, useful for durably protecting wool against moths.

HENRY MARTIN.
HANS HEINRICH ZAESLIN.
CURT GLATTHAAR.
ALFRED STAUB.
RUDOLF HIRT.